(12) United States Patent
Yang

(10) Patent No.: US 11,188,899 B2
(45) Date of Patent: Nov. 30, 2021

(54) OFF NETWORK IDENTITY TRACKING IN ANONYMOUS CRYPTOCURRENCY EXCHANGE NETWORKS

(71) Applicant: DMG Blockchain Solutions Inc., Vancouver (CA)

(72) Inventor: Danny Yang, Santa Clara, CA (US)

(73) Assignee: DMG BLOCKCHAIN SOLUTIONS INC., Vancouver (CA)

( * ) Notice: Subject to any disclaimer, the term of this patent is extended or adjusted under 35 U.S.C. 154(b) by 1163 days.

(21) Appl. No.: 15/093,244

(22) Filed: Apr. 7, 2016

(65) Prior Publication Data

US 2016/0300222 A1    Oct. 13, 2016

Related U.S. Application Data

(60) Provisional application No. 62/144,144, filed on Apr. 7, 2015.

(51) Int. Cl.
| | |
|---|---|
| *G06Q 20/36* | (2012.01) |
| *G06Q 20/06* | (2012.01) |
| *G06Q 20/10* | (2012.01) |
| *G06Q 20/38* | (2012.01) |

(52) U.S. Cl.
CPC ....... *G06Q 20/3678* (2013.01); *G06Q 20/065* (2013.01); *G06Q 20/10* (2013.01); *G06Q 20/383* (2013.01)

(58) Field of Classification Search
None
See application file for complete search history.

(56) References Cited

U.S. PATENT DOCUMENTS

| | | | | |
|---|---|---|---|---|
| 2013/0282585 | A1* | 10/2013 | Walls | G06Q 20/04 705/44 |
| 2015/0310424 | A1* | 10/2015 | Myers | G06Q 20/3678 705/69 |
| 2016/0234026 | A1* | 8/2016 | Wilkins | G06F 21/64 |
| 2016/0292672 | A1* | 10/2016 | Fay | G06Q 20/36 |

* cited by examiner

*Primary Examiner* — Steven S Kim
*Assistant Examiner* — Jason B Fenstermacher
(74) *Attorney, Agent, or Firm* — Perkins Coie LLP; Colin Fowler

(57) ABSTRACT

Various embodiments include a method of facilitating identity information exchange in a cryptocurrency transaction. An information compliance computer system can receive a pending cryptocurrency transaction from a transmitter wallet service system for managing one or more user wallet accounts, each associated with one or more cryptographically verifiable addresses in a cryptocurrency exchange network. The information compliance computer system can identify a recipient wallet service system associated with a destination address indicated by the pending cryptocurrency transaction. Information compliance computer system can exchange identity information between the transmitter wallet service system and the recipient wallet service system. The information compliance computer system can publish the pending cryptocurrency transaction to the cryptocurrency exchange network for inclusion into a block chain of the cryptocurrency network.

8 Claims, 7 Drawing Sheets

OFF NETWORK IDENTITY TRACKING IN ANONYMOUS CRYPTOCURRENCY EXCHANGE NETWORKS

CROSS-REFERENCE TO RELATED APPLICATION(S)

This application claims the benefit of U.S. Provisional Patent Application No. 62/144,144, entitled "OFF NETWORK IDENTITY TRACKING IN ANONYMOUS CRYPTOCURRENCY EXCHANGE NETWORKS," which was filed on Apr. 7, 2015, and is incorporated by reference herein in its entirety.

BACKGROUND

Various types of computer network systems are employed to facilitate electronic transactions that transfers value between at least two accounts. In designing a computer system to facilitate electronic transactions, privacy, security, and efficiency are often the primary concerns. The security of modern day computer systems for financial institutes often depends on legal regulations and security rules. These legal regulations may require retention of information and sometimes involvement of third parties (e.g., human agents or computerized agents) in every electronic transaction that transfers value. Some of these third parties may even modify the content of the electronic transaction. These requirements inevitably spread the information relating an electronic transaction to more entities and inevitably delay the actual transference of value. The technical requirements to balance the needs for security, privacy and efficiency, as well as regulatory compliance across a computer exchange network, are often times challenging.

Figure 1:
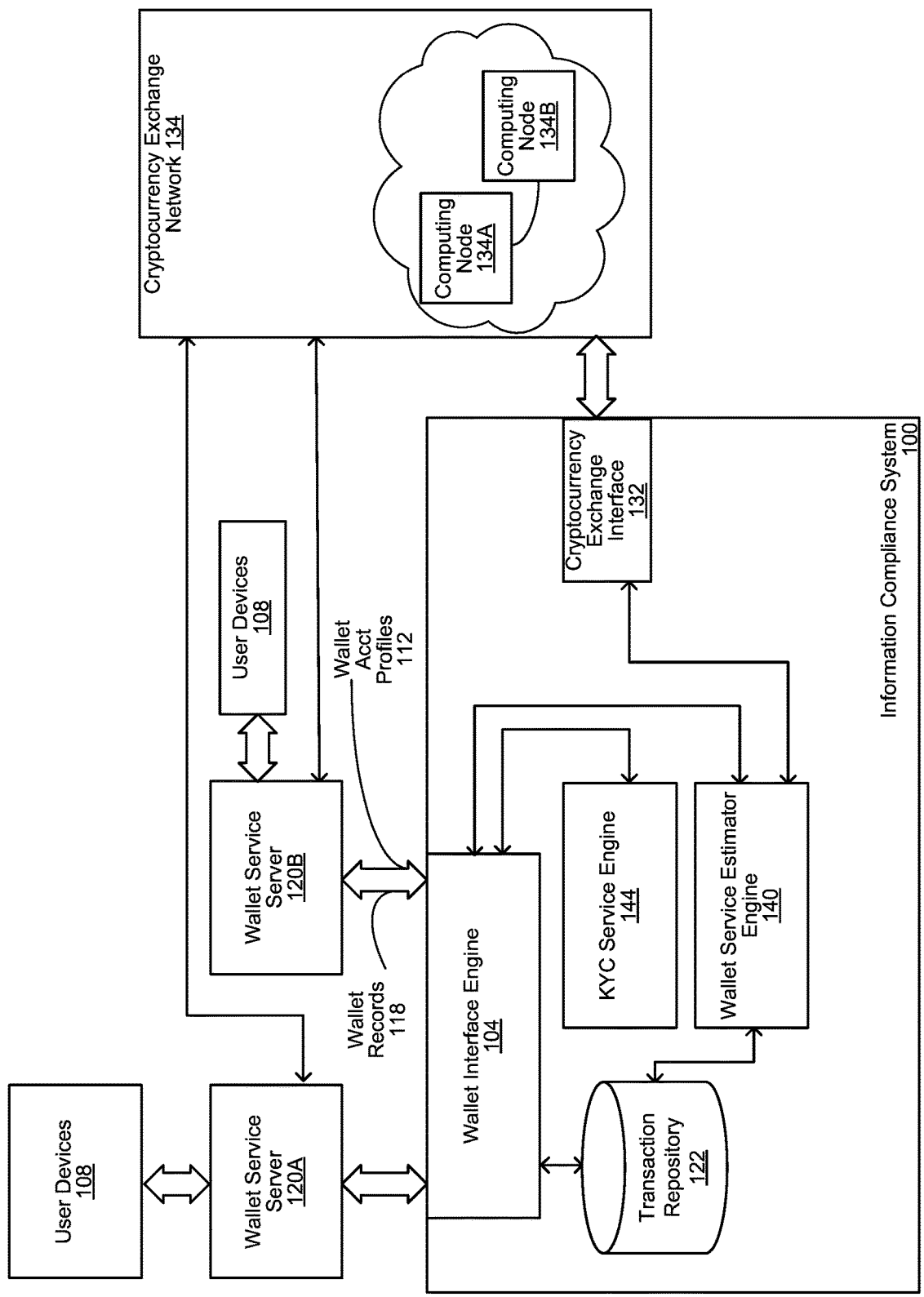
FIG. 1 is a block diagram of an operating environment of an information compliance system, in accordance with various embodiments.

The figures depict various embodiments of this disclosure for purposes of illustration only. One skilled in the art will readily recognize from the following discussion that alternative embodiments of the structures and methods illustrated herein may be employed without departing from the principles of the invention described herein.

DETAILED DESCRIPTION

"Currency" refers to money that can use in circulation as a medium of exchange representing quantified value. "Fiat currency" refers to money that derives its value from government regulation or law. A "virtual currency" refers to a medium of exchange that is electronically created and stored. A "cryptocurrency" is a type of virtual currency. Cryptocurrency, such as Bitcoin, refers to a digital medium of exchange that uses cryptography for security and prevention of counterfeiting and/or fraud. Cryptocurrency can be implemented in a distributed manner across a network of computing devices that maintains a digital banking ledger, such as in the form of a block chain. The block chain is a shared public ledger on which the cryptocurrency network relies. All confirmed electronic financial transactions using the cryptocurrency are included in the block chain. The integrity and the chronological order of the block chain are enforced with cryptography. Further examples of cryptocurrency exchange networks are described in FIGS. 5 to 7.

A financial transaction can occur between cryptocurrency wallets. When the financial transaction is initiated, it is propagated through the cryptocurrency network and eventually incorporated in a block of the block chain by a miner entity in the cryptocurrency network.

A "wallet" or a "wallet service" herein refers to implementation of a virtual currency wallet that is accessible online via the Internet, providing users a portal to initiate financial transactions within a virtual currency economy. For example, cryptocurrency-related services and exchanges that are able to spend or pay out withdrawals instantly can be said to be paying them from a "wallet service." The wallet service can be implemented by one or more computer servers storing one or more private keys that can authorize financial transactions to a cryptocurrency network.

"Mining" herein refers to a distributed consensus system in a cryptocurrency network that is used to confirm waiting transactions by including them in the block chain. The process of mining enforces a chronological order in the block chain, protects the neutrality of the cryptocurrency network, and allows different computers to agree on the state of the cryptocurrency system. To be confirmed and/or authenticated, transactions must be packed in a block that fits strict cryptographic rules that will be verified by the cryptocurrency network. These rules prevent previous blocks from being modified because doing so would invalidate all following blocks. Mining also creates the equivalent of a competitive lottery that prevents any individual from easily adding new blocks consecutively in the block chain. This way, no individuals can control what is included in the block chain or replace parts of the block chain to roll back their own spends. "Miner" herein refers to an entity that participates in the mining activity by attempting to cryptographically solve a computational challenge required to generate a new block.

Cryptocurrency is a potential solution to facilitate electronic transactions that are secured, private, and efficient. Particularly, cryptocurrency (e.g., Bitcoin) exchanges are often implemented by a distributed consensus system maintaining a "block chain" (e.g., through consensus) that cryptographically ensures irrepudiable provenance of each electronic transaction published thereon. The block chain is publicly accessible such that any device can verify the authenticity of an electronic transaction in a block of the block chain. The block chain can hold value in one or more unique cryptographic addresses whose ownership can be cryptographically verified. The block chain maintains the anonymity of its users because it stores only association between the unique cryptographic addresses and quantified transactions of values without storing identity information of the owners of the unique cryptographic addresses.

However, cryptographically implemented anonymity, or even partial/pseudo anonymity, has its problems. For example, anonymity of participants in electronic transactions oftentimes violate information storage/retention regulations. For example, under the Travel Rule of Bank Security Act, identity information (e.g., real name and addresses) of an electronic transaction of a threshold value have to be stored and maintained for up to five years. A technical problem arises when attempting to comply with these regulations. For example, because the block chain is completely public, it is not secure to publish or store identity information along with the electronic transactions into the block chain.

Identity information that may be pertinent to information retention regulation may include a transmitter's information (e.g., name, account number, and address), a recipient's information (e.g., name, account number, and address), and/or transmission details (e.g., ID of transmitting financial institution, value, execution date, ID of recipient financial institution, etc.). Additional supplementary data may also be required.

Several embodiments describe an information compliance system that operates outside of a cryptocurrency exchange network maintaining a block chain. The information compliance system enables wallet services to comply with regulations on a computer-architecture level. That is, the information compliance system advantageously implements a communication protocol to ensure information retention compliance of a cryptocurrency transaction despite reliance on an anonymous or pseudo-anonymous, distributed, cryptocurrency exchange network. The information compliance system can be implemented by one or more computing devices. The information compliance system can communicate with one or more known wallet service systems. Whenever a user of a wallet service system initiates a pending electronic cryptocurrency transaction, the wallet service system can notify the information compliance system prior to publication of the pending electronic cryptocurrency transaction into a block chain of a cryptocurrency exchange network.

The pending electronic cryptocurrency transaction can be associated with a source address and a destination address. Both the source address and the destination address are unique cryptographic addresses represented or to be represented on the block chain. Once the information compliance system receives the notification of the pending electronic cryptocurrency transaction, the information compliance system can predict a target wallet service responsible for a user account associated with the destination address.

For example, the information compliance system can regularly compile/process public and/or private information associated with the block chain via one or more machine learning algorithms for analysis. For example, the information compliance system can cluster, label, or match the unique cryptographic addresses to produce a mapping of wallet services to the unique cryptographic addresses. For example, a wallet service estimator engine of the information compliance system can use the machine learning algorithms to generate a mapping of destination addresses to wallet services. The wallet service estimator engine can also use the machine learning algorithms to generate a function that can predict a wallet service associated with a destination address according to one or more known attributes (e.g., publicly available attributes on the block chain, publicly available attributes in one or more systems external to the cryptographic exchange network, privately available attributes tracked by the wallet service estimator engine, or other attributes inherent in the destination address) of the destination address. Based on the prediction of a target wallet service associated with the destination address, the information compliance system can request the target wallet service to provide proof of ownership of the destination address. Because the wallet service is a manager of a user account that owns the destination address, the wallet service has the cryptographic information necessary to verify ownership.

In some embodiments, the wallet service estimator engine can also determine a confidence level of its prediction. When the confidence level is below a threshold, the wallet service estimator engine can broadcast a query feed to the known wallet services regarding the pending cryptocurrency transaction as an unclaimed transaction. When a target wallet service volunteers itself as a manager/owner of the destination address, the information compliance system can request the target wallet service to provide proof of ownership.

Responsive to receiving a proof of ownership of a destination address associated with the pending electronic cryptocurrency transaction, the information compliance system can facilitate the sharing of identity information of an account holder of the source address and an account holder of the destination address. The information compliance system can determine information retention regulations that are applicable to the pending electronic cryptocurrency transaction. When facilitating the sharing of identity information, the information compliance system can notify the participating wallet services of the necessary identity information to share.

In several embodiments, sharing of the identity information is done by having both parties send the identity information to the information compliance system. In some embodiments, the information compliance system can store the identity information in a secured identity repository associated with the pending electronic cryptocurrency transaction. The information compliance system can also track the status of the electronic cryptocurrency transaction as it propagates through the block chain of the intended cryptocurrency exchange network. For example, the information compliance system can track whether the pending electronic cryptocurrency transaction is published and/or accepted to the block chain. If not, the information compliance system can delete the identity information. In some embodiments, the information compliance system can share the identity information with both the wallet service system that initiated the pending electronic cryptocurrency transaction and the target wallet service system that is verified as the managing wallet service for the destination address.

In several embodiments, sharing of the identity information is done without the information compliance system getting the actual identity information. For example, the information compliance system can notify both the wallet service system that initiated the pending electronic cryptocurrency transaction and the target wallet service system that is verified as the managing wallet service for the destination address. Once notified, the wallet service systems can share the identity information with each other directly and/or securely.

In some embodiments, the participating wallet services in the pending electronic cryptocurrency transaction can publish the electronic cryptocurrency transaction to a cryptocurrency exchange network for inclusion into a block chain. In some embodiments, the participating wallet services in the pending electronic cryptocurrency transaction can rely on the information compliance system to publish the electronic cryptocurrency transaction to the cryptocurrency exchange network. In these embodiments, having the information compliance system publish all electronic cryptocurrency transactions for multiple wallet service systems provides an added layer of security. This way, third parties cannot track or monitor these transactions as being associated with a particular wallet service system.

In several embodiments, the information compliance system can implement a service to enable a transmitter wallet service and a receiver wallet service in a cryptocurrency transaction to share the private user information off of the public block chain of a cryptocurrency exchange network. This is valuable for a technical implementation of an electronic compliance enforcement protocol. The private user information never enters the block chain, and is only known by the transmitter wallet service and the receiver wallet service (optionally also the information compliance system). The information compliance system can be a third party that matches the transmitter wallet service to the receiver wallet service. The information compliance system does not have access to the funds of the transaction thus increasing security. The information compliance system can record the private information for a period of time as required by an information retention regulation.

In several embodiments, the information compliance system can implement additional services. While a pending cryptocurrency transaction is discussed as having a single transmitter account/source cryptographic address (corresponding to a transmitter wallet service) and a single recipient account/destination cryptographic address (corresponding to a recipient wallet service), various embodiments can also apply to multiparty transactions. For example, a pending cryptocurrency transaction can include multiple transmitter accounts or multiple source cryptographic addresses. The pending cryptocurrency transaction can also include multiple recipient accounts or multiple destination cryptographic addresses.

In several embodiments, each or some of the communications between a wallet service and the information compliance system can be protected via a multi-signature authentication protocol. For example, the systems involved can use multiple methods to verify the authenticity of each other's identity.

FIG. 1 is a block diagram of an operating environment of an information compliance system 100, in accordance with various embodiments. The information compliance system 100 can be implemented with one or more computing devices, such as the computing device 400 of FIG. 4. The information compliance system 100 can implement a wallet interface engine 104 to communicate with one or more wallet services. For example, the wallet interface engine 104 may be accessible as one or more application programming interfaces (APIs) and/or one or more web-based (e.g., HTML, Flash™, Java Applet, JavaScript, etc.) portals, thereby enabling user devices 108 to communicate with the wallet interface engine 104. The wallet interface engine 104 can provide wallet service for the user devices 108.

The wallet interface engine 104 can request wallet account profiles 112 and/or wallet records 118 from an external wallet service (e.g., a wallet service server 120A or a wallet service server 120B, collectively as the "wallet service servers 120). The wallet account profiles 112 and the wallet records 118 can be cached or persistently stored in a transaction repository 122 of the information compliance system 100. The wallet account profiles 112 can include identity information of a wallet account user. For example, identity information can include name, account number, and address of the wallet account user. The wallet records 118 can store the accounting balances and/or transaction records for the wallet accounts provided by the wallet service.

In some embodiments, a user device can initiate a cryptocurrency transaction in a transmitter wallet service (e.g., the wallet service server 120A) from a wallet account. The transmitter wallet service can notify the information compliance system 100 regarding the cryptocurrency transaction via the wallet interface engine 104. For example, the cryptocurrency transaction can be a deposit of cryptocurrency. In some embodiments, the cryptocurrency transaction can involve more than just a transfer of cryptocurrency. For example, certain types of cryptocurrency (e.g., color coins) can be linked to other assets (e.g., gold, stocks, property, fiat currency, etc.). These complex cryptocurrency transactions can also trigger the Travel Rule or other information retention compliance requirements. Several embodiments, the involvement of other assets is also notified to the information compliance system 100 via the wallet interface engine 104.

The wallet services can communicate a cryptocurrency exchange network 134 including one or more distributed server nodes (e.g., a computing node 134A, a computing node 134B, etc., collectively as the "cryptocurrency exchange network 134"). The information compliance system 100 can also communicate with the cryptocurrency exchange network 134 via a cryptocurrency exchange interface 132. When one of the user devices 108 initiates a cryptocurrency transaction on a wallet service, the wallet service eventually causes the pending cryptocurrency transaction to publish onto the cryptocurrency exchange network 134. The cryptocurrency exchange network 134 then reaches a consensus of whether to include the pending cryptocurrency transaction in the accepted block chain.

In several embodiments, the information compliance system 100 can receive an indication of a pending cryptocurrency transaction from a transmitter wallet service via the wallet interface engine 104. The information compliance system 100 can determine, via a wallet service estimator engine 140, a possible managing wallet service associated with a destination address in the pending cryptocurrency transaction. The wallet service estimator engine 140 can monitor public and/or private data via the cryptocurrency exchange interface 132 to build a static mapping or dynamic mapping (e.g., mapping determined via a function that takes attributes of a destination address as inputs) between cryptographic addresses and associated wallet services. In some embodiments, the wallet interface engine 104 can receive a list or a function to enable the wallet service estimator engine 140 to build the static or dynamic mapping.

The information compliance system 100 can verify the possible managing wallet service is correct by sending an electronic verification request to the possible managing wallet service. Upon verification, the information compliance system 100 can facilitate sharing of the identity information associated with a recipient user account in the verified managing wallet service and a transmitting user account in the transmitting wallet service.

In some embodiments, the information compliance system 100 includes a know-your-customer (KYC) service engine 144. The KYC service engine 144 can provide a service to perform a KYC check. A KYC check refers to verification of the authenticity of a person's identifiers. For example, a KYC check can include verifying a person with the person's address. The KYC service engine 144 enables users to utilize wallet services without providing user identifying information at sign-up (although a user may still have to provide that information at the time of initiating or receiving a cryptocurrency transaction).

Functional components (e.g., interfaces, engines, modules, and data storage) associated with the information compliance system 100 can be implemented as circuitry, firmware, software, or other functional instructions. For example, the functional components can be implemented in the form of special-purpose circuitry, in the form of one or more appropriately programmed processors, a single board chip, a field programmable gate array, a network-capable computing device, a virtual machine, a cloud computing environment, or any combination thereof. For example, the functional components described can be implemented as instructions on a tangible storage memory capable of being executed by a processor or other integrated circuit chip. The tangible storage memory may be volatile or non-volatile memory. In some embodiments, the volatile memory may be considered "non-transitory" in the sense that it is not a transitory signal. Memory space and storages described in the figures can be implemented with the tangible storage memory as well, including volatile or non-volatile memory.

Each of the functional components may operate individually and independently of other functional components. Some or all of the functional components may be executed on the same host device or on separate devices. The separate devices can be coupled through one or more communication channels (e.g., wireless or wired channel) to coordinate their operations. Some or all of the functional components may be combined as one component. A single functional component may be divided into sub-components, each sub-component performing separate method step or method steps of the single component.

In some embodiments, at least some of the functional components share access to a memory space. For example, one functional component may access data accessed by or transformed by another functional component. The functional components may be considered "coupled" to one another if they share a physical connection or a virtual connection, directly or indirectly, allowing data accessed or modified by one functional component to be accessed in another functional component. In some embodiments, at least some of the functional components can be upgraded or modified remotely (e.g., by reconfiguring executable instructions that implements a portion of the functional components). The systems, engines, or devices described may include additional, fewer, or different functional components for various applications.

Figure 2:
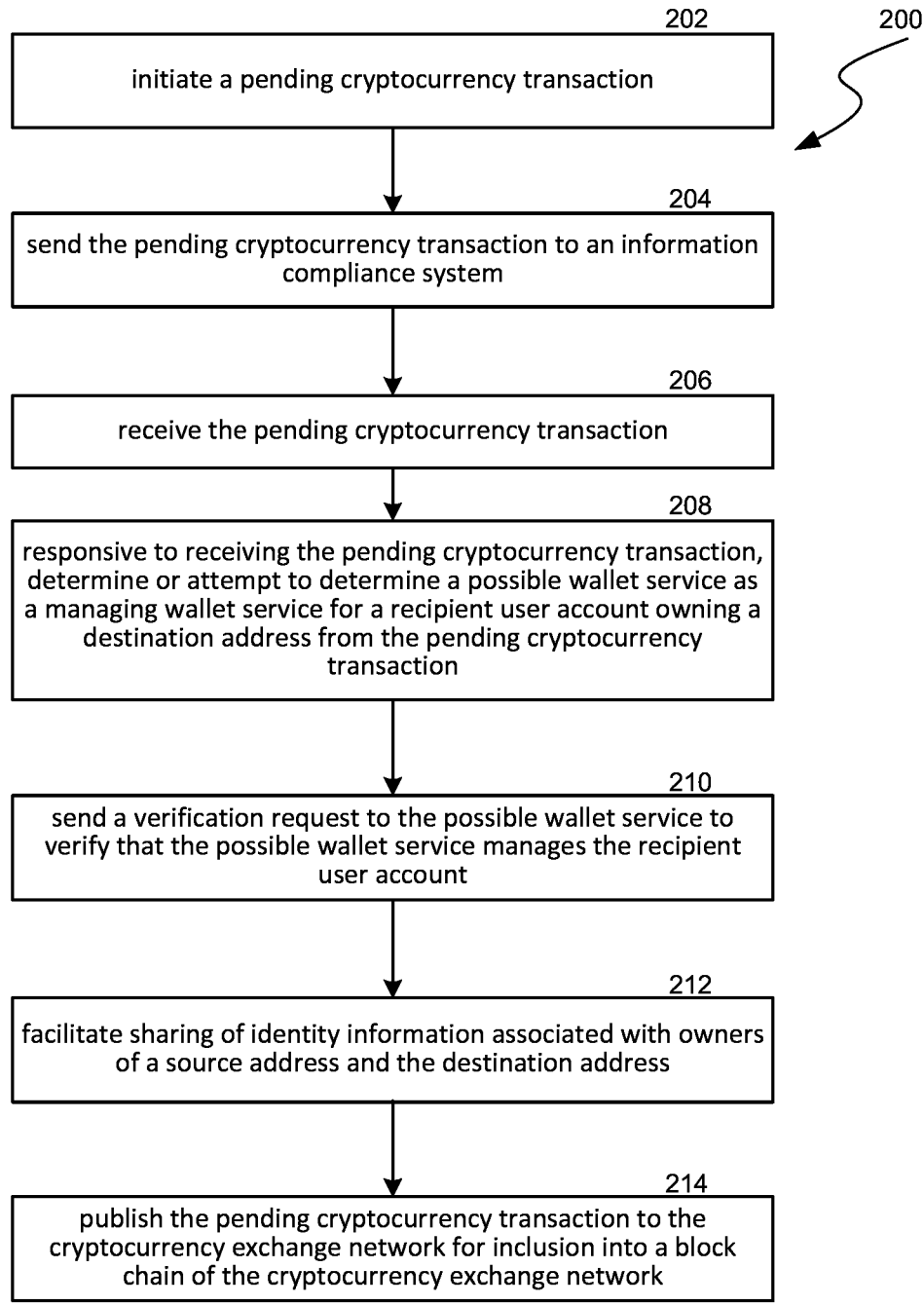
FIG. 2 is a flow chart of a method of operating an information compliance system to enforce information retention compliance for wallet services associated with a cryptocurrency exchange network, in accordance with various embodiments.

FIG. 2 is a flow chart of a method 200 of operating an information compliance system (e.g., the information compliance system 100 of FIG. 1) to enforce information retention compliance for wallet services associated with a cryptocurrency exchange network, in accordance with various embodiments. At step 202, a first wallet service system can initiate a pending cryptocurrency transaction. The first wallet service system can manage multiple user wallet accounts storing values usable in a cryptocurrency exchange network.

At step 204, the first wallet service system can send the pending cryptocurrency transaction to an information compliance system. The information compliance system can be external to the first wallet service system. At step 206, the information compliance system can receive the pending cryptocurrency transaction.

At step 208, responsive to receiving the pending cryptocurrency transaction, the information compliance system can determine or attempt to determine a possible wallet service as a managing wallet service for a recipient user account owning a destination address from the pending cryptocurrency transaction. At step 210, the information compliance system can send a verification request to the possible wallet service to verify that the possible wallet service manages the recipient user account.

In several embodiments, the information compliance system can determine the managing wallet service for the recipient user account by monitoring the block chain overtime (e.g., a time period spanning before the pending cryptocurrency transaction is initiated till after the pending cryptocurrency transaction is published onto the block chain). In some embodiments, the information compliance system can monitor for permanent signals in the block chain (e.g., transaction entries in the block chain that are stored in a distributive fashion in computing nodes of the cryptocurrency exchange network). In some embodiments, the information compliance system monitors ephemeral signals from the cryptocurrency exchange network or devices communicating with the cryptocurrency exchange network. Via the monitored data, the information compliance system can perform analysis (e.g., identified trends in the block chain) to generate a mapping table of one or more unique cryptographic addresses to one or more wallet services. The information compliance system can then determine the managing wallet service by identifying a wallet service corresponding to the destination address in the mapping table as potentially the managing wallet service.

Figure 3:
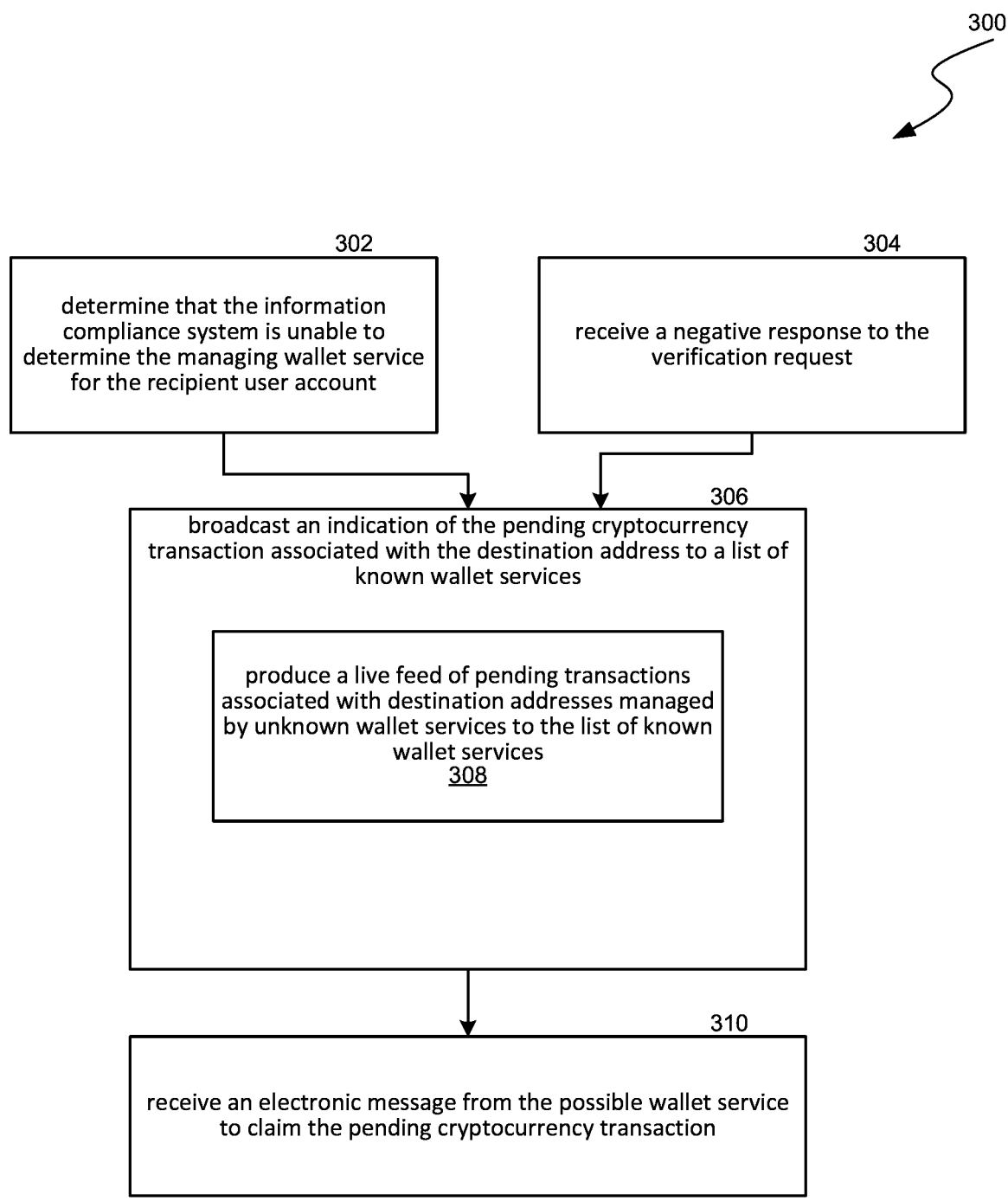
FIG. 3 is a flow chart of a method of operating an information compliance system to determine a possible wallet service associated with a unique cryptographic address in a block chain of a cryptocurrency exchange network, in accordance with various embodiments

In several embodiments, the information compliance system can utilize other methods of determining the managing wallet service for the recipient user account. For example, FIG. 3 illustrates a way of querying known wallet services to claim a pending cryptocurrency transaction. For another example, a wallet service in partnership with the information compliance system can provide the information compliance system with a list of cryptographic addresses that it owns or one or more methods/functions of generating cryptographic addresses it owns.

At step 212, the information compliance system can facilitate sharing of identity information associated with owners of a source address and the destination address. Identity information can be shared by collecting the identity information from participating wallet services and providing access to the collected identity information to the participating wallet services. Identity information can also be shared by notifying the participating wallet services of each other's involvement, and enabling the participating wallet services to directly share identity information. Step 212 can be responsive to verifying the possible wallet service. At step 214, the information compliance system or one of the wallet services can publish the pending cryptocurrency transaction to the cryptocurrency exchange network for inclusion into a block chain of the cryptocurrency network.

FIG. 3 is a flow chart of a method 300 of operating an information compliance system (e.g., the information compliance system 100 of FIG. 1) to determine a possible wallet service associated with a unique cryptographic address (e.g., destination address) in a block chain of a cryptocurrency exchange network, in accordance with various embodiments. The method 300 can follow from step 208 of FIG. 2 or step 210 of FIG. 2. At step 302, the information compliance system can determine that it is unable to determine the managing wallet service for the recipient user account owning the destination address from the pending cryptocurrency transaction. For example, determining that the information compliance system is unable to determine the managing wallet service can include: computing a confidence level of identifying a potential wallet service as being associated with the destination address; and determining that the confidence level is below a pre-determined threshold. At step 304, the information compliance system can receive a negative response to the verification request sent at step 210.

At step 306, responsive to being unable to determine the possible wallet service or unable to verify, the information compliance system can broadcast an indication of the pending cryptocurrency transaction associated with the destination address to a list of known wallet services. For example, the information compliance system can broadcast the entirety of the pending cryptocurrency transaction to the list of known wallet services. For another example, the information compliance system can broadcast at least the destination address or a representative hash of the destination address of the pending cryptocurrency transaction to the list of known wallet services. The broadcasting can be perform as a live feed or periodic batches according to a schedule. In the example of the live feed, the information compliance system can produce a live feed of pending transactions associated with destination addresses managed by unknown wallet services to the list of known wallet services at step 308. Part of step 306 can be to add the indication of the pending cryptocurrency transaction to the live feed.

At step 310, the information compliance system can receive an electronic message from the possible wallet service to claim the pending cryptocurrency transaction. The electronic message can be in response to the broadcasting of the indication of the pending cryptocurrency transaction.

Figure 8:
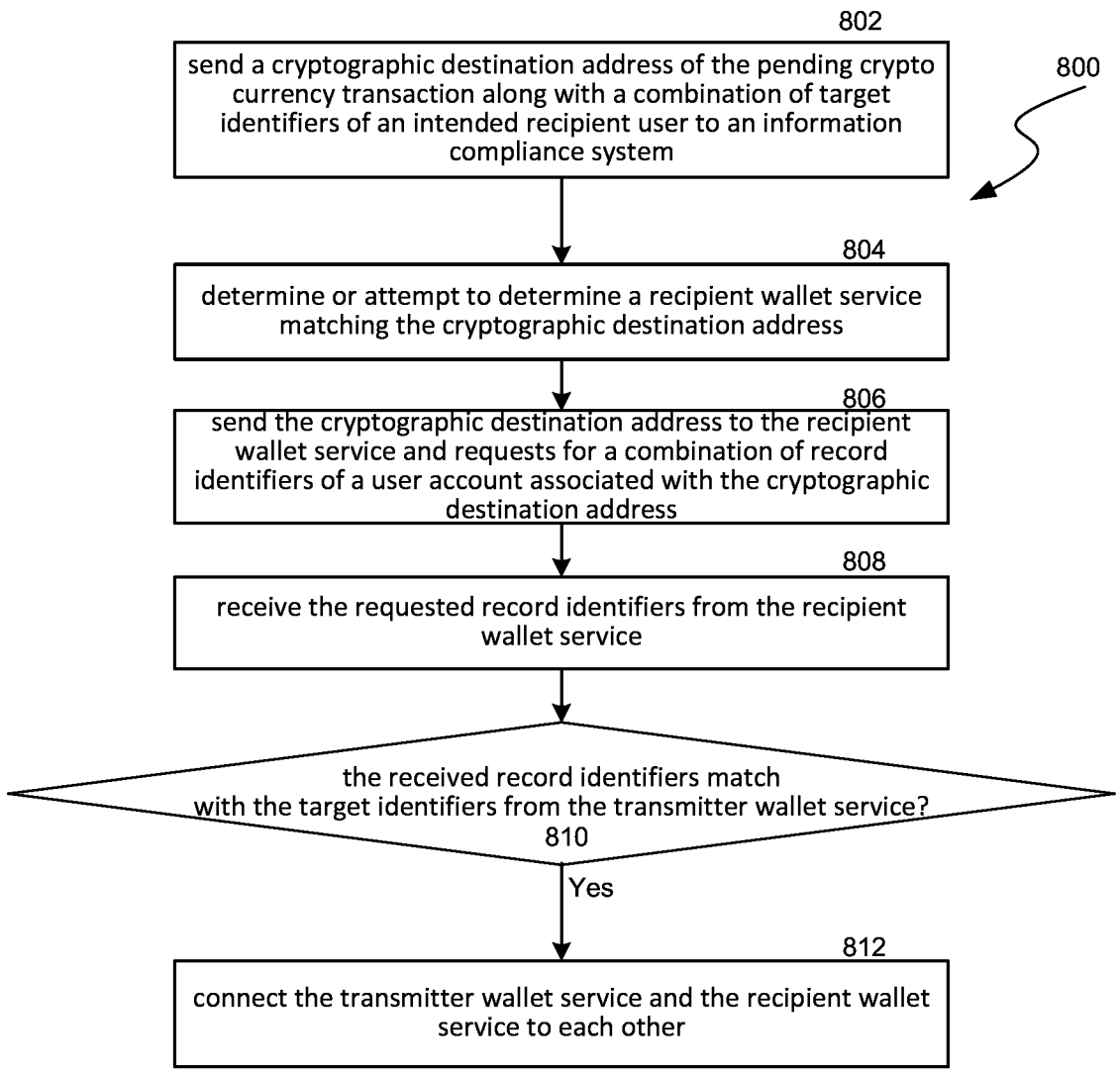
FIG. 8 is a flow chart of an example method of providing a wallet provider matching service, in accordance with various embodiments.

FIG. 8 is a flow chart of an example method of providing a wallet provider matching service, in accordance with various embodiments. At step 802, in response to a user initiated, pending cryptocurrency transaction, a transmitter wallet service can send a cryptographic destination address of the pending cryptocurrency transaction along with a combination of target identifiers of an intended recipient user to an information compliance system. At step 804, the information compliance system can determine or attempt to determine a recipient wallet service matching the cryptographic destination address. If the information compliance system cannot determine the recipient wallet service from data analysis, it can query all known wallet services to claim the pending cryptocurrency transaction. If the information compliance system can identify the recipient wallet service, but the recipient wallet service is not a partner of the services provided by the information compliance system, then the information compliance system can automatically contact the recipient wallet service to execute the following steps.

At step 806, the information compliance system can send the cryptographic destination address to the recipient wallet service and requests for a combination of record identifiers of a user account associated with the cryptographic destination address. At step 808, the information compliance system can receive the requested record identifiers from the recipient wallet service. At step 810, the information compliance system can determine if the received record identifiers match with the target identifiers from the transmitter wallet service. At step 812, responsive to determining that the received record identifiers match the target identifiers, the information compliance system connects the transmitter wallet service and the recipient wallet service to each other.

While processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. In addition, while processes or blocks are at times shown as being performed in series, these processes or blocks may instead be performed in parallel, or may be performed at different times. When a process or step is "based on" a value or a computation, the process or step should be interpreted as based at least on that value or that computation.

Figure 4:
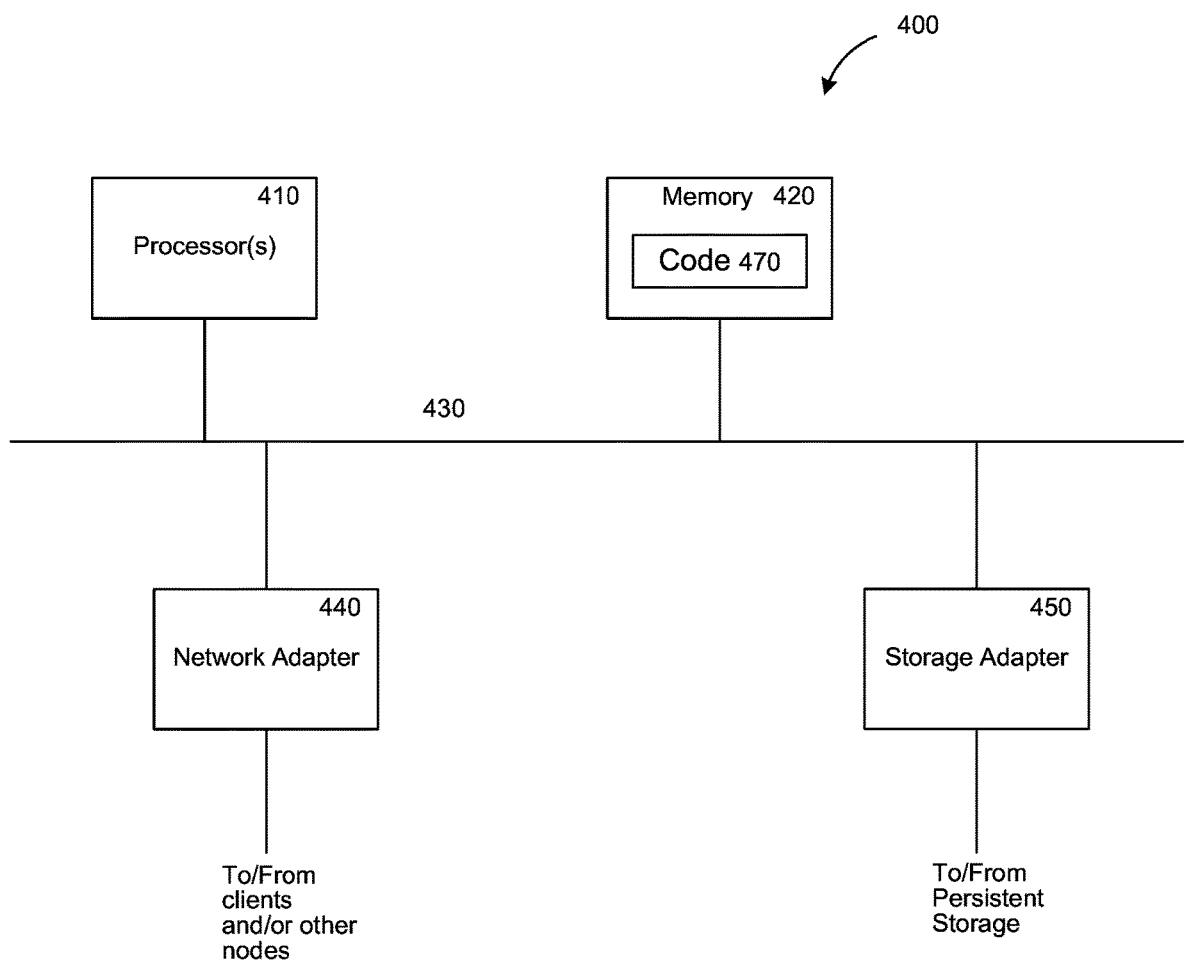
FIG. 4 is a block diagram of an example of a computing device, which may represent one or more computing device or server described herein, in accordance with various embodiments.

FIG. 4 is a block diagram of an example of a computing device 400, which may represent one or more computing device or server described herein, in accordance with various embodiments. The computing device 400 can be one or more computing devices that implement the information compliance system 100 of FIG. 1. The computing device 400 can implement methods and processes described in this disclosure (e.g., the method 200 of FIG. 2). The computing device 400 includes one or more processors 410 and memory 420 coupled to an interconnect 430. The interconnect 430 shown in FIG. 4 is an abstraction that represents any one or more separate physical buses, point-to-point connections, or both connected by appropriate bridges, adapters, or controllers. The interconnect 430, therefore, may include, for example, a system bus, a Peripheral Component Interconnect (PCI) bus or PCI-Express bus, a Hyper-Transport or industry standard architecture (ISA) bus, a small computer system interface (SCSI) bus, a universal serial bus (USB), IIC (I2C) bus, or a "Firewire".

The processor(s) 410 is/are the central processing unit (CPU) of the computing device 400 and thus controls the overall operation of the computing device 400. In certain embodiments, the processor(s) 410 accomplishes this by executing software or firmware stored in memory 420. The processor(s) 410 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 420 is or includes the main memory of the computing device 400. The memory 420 represents any form of random access memory (RAM), read-only memory (ROM), flash memory, or the like, or a combination of such devices. In use, the memory 420 may contain a code 470 containing instructions according to the mesh connection system disclosed herein.

Also connected to the processor(s) 410 through the interconnect 430 are a network adapter 440 and a storage adapter 450. The network adapter 440 provides the computing device 400 with the ability to communicate with remote devices, over a network and may be, for example, an Ethernet adapter or Fibre Channel adapter. The network adapter 440 may also provide the computing device 400 with the ability to communicate with other computers. The storage adapter 450 enables the computing device 400 to access a persistent storage, and may be, for example, a Fibre Channel adapter or SCSI adapter.

The code 470 stored in memory 420 may be implemented as software and/or firmware to program the processor(s) 410 to carry out actions described above. In certain embodiments, such software or firmware may be initially provided to the computing device 400 by downloading it from a remote system through the computing device 400 (e.g., via network adapter 440).

The techniques introduced herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium," as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

The term "logic," as used herein, can include, for example, programmable circuitry programmed with specific software and/or firmware, special-purpose hardwired circuitry, or a combination thereof.

Figure 5:
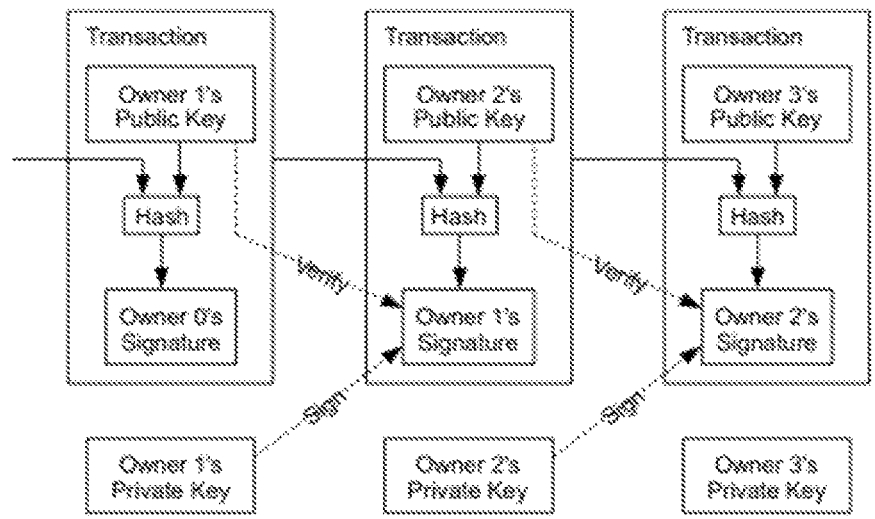
FIG. 5 is a data flow diagram illustrating construction of cryptocurrency transactions, in accordance with various embodiments.

FIG. 5 is a data flow diagram illustrating construction of cryptocurrency transactions 500, in accordance with various embodiments. In some embodiments, cryptocurrency can be implemented as a decentralized peer-to-peer currency that uses a "gossip protocol" to transmit messages among peers in an overlay network. Cryptocurrency "coins" are transferred among cryptocurrency addresses within the cryptocurrency transactions 500, which are then grouped into blocks that must be accepted by a cryptocurrency exchange network. An owner of a cryptocurrency address can transfer coins by digitally signing (e.g., via ECDSA) a hash digest of a previous transaction and the public key of the next owner. This signature is then appended to the end of the coin.

Figure 6:
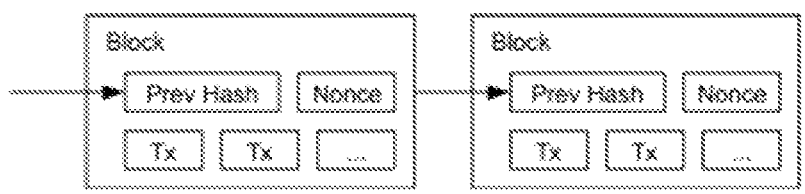
FIG. 6 is a data diagram of a block in a block chain of a cryptocurrency exchange network, in accordance with various embodiments.
Figure 7:
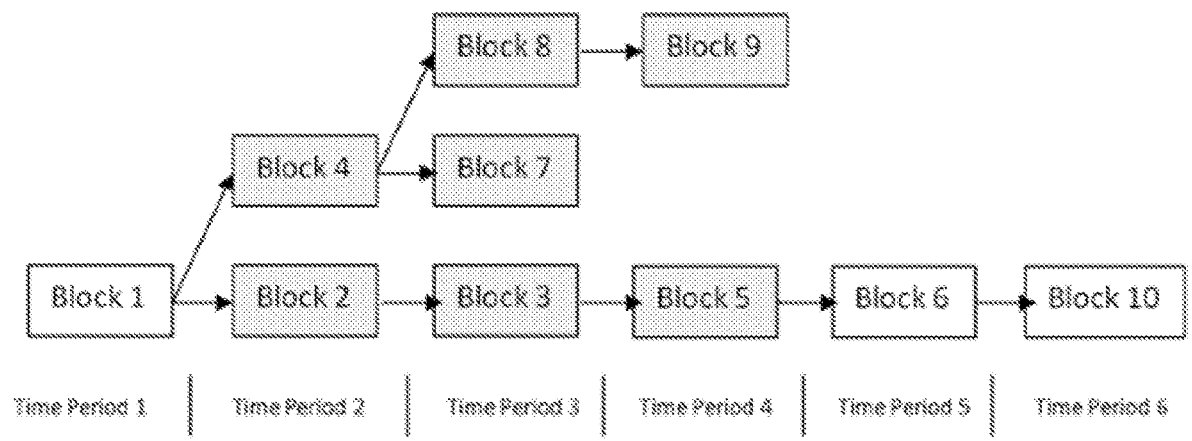
FIG. 7 is a state diagram illustrating creation of a block chain in a cryptocurrency exchange network, in accordance with various embodiments.

FIG. 6 is a data diagram of a block in a block chain of a cryptocurrency exchange network, in accordance with various embodiments. Pending cryptocurrency transactions can be placed in "blocks." The blocks can be linked by hashes (e.g., SHA256 hash). Although the "accepted chain" representing the legitimate block chain can be considered a linked list, the block chain can also be represented with a tree as shown in FIG. 7.

New cryptocurrency is minted as cryptocurrency coins. Coin generation is tied to block creation. Creating a block is computationally expensive since it requires solving a cryptographic proof-of-work puzzle. Anytime a computing node in a cryptocurrency exchange network (e.g., a distributed consensus system) generates a block which goes on to be accepted by the cryptocurrency exchange network, the computing node is awarded a certain number of cryptocurrency "coins," representing a certain unit of cryptocurrency. This reward can change over time. In some embodiments, not all blocks can be accepted network-wide (i.e., not all generated blocks warrant an award).

In the block chain, newer blocks are linked to older blocks, forming a directed chain that is constantly being extended by newer blocks. Because of the cryptocurrency exchange network's decentralized and distributed nature, multiple participants may generate blocks at the same time. For example, in FIG. 7, blocks 3, 7 and 8 are all created at the same time. FIG. 7 is a state diagram illustrating creation of a block chain in a cryptocurrency exchange network, in accordance with various embodiments. This leads to a distributed consensus problem. For a period of time before consensus is reached, the block chain can be represented as a tree instead of a single linked list. The longest path can represent the accepted chain or to be accepted chain. A participant choosing to extend an existing path in the block chain indicates a vote towards consensus on that path. The longer the path, the more computation was expended building it. In several embodiments, the tree has a branching factor close to one at any given moment—in other words, there is very little contention about which chain is longest. In this way, a cryptocurrency exchange network offers a unique solution to the consensus problem in distributed systems since voting power is directly proportional to computing power.

Some embodiments of the disclosure have other aspects, elements, features, and steps in addition to or in place of what is described above. These potential additions and replacements are described throughout the rest of the specification. Reference in this specification to "various embodiments," several embodiments, or "some embodiments" means that a particular feature, structure, or characteristic described in connection with the embodiment is included in at least one embodiment of the disclosure. These embodiments, even alternative embodiments (e.g., referenced as "other embodiments") are not mutually exclusive of other embodiments. Moreover, various features are described which may be exhibited by some embodiments and not by others. Similarly, various requirements are described which may be requirements for some embodiments but not other embodiments.

Various embodiments include a computer-implemented method of operating an information compliance system (e.g., a computer server system). The information compliance system receives a pending cryptocurrency transaction from a transmitter wallet service system for managing one or more user wallet accounts. Each wallet account can be associated with one or more cryptographically verifiable addresses (e.g., addresses whose ownership can be verified using a cryptographic key, such as by producing a cryptographic signature that is consistent with the cryptographic key) in a cryptocurrency exchange network. The cryptographically verifiable addresses can be referenced by one or more electronic transaction records in a cryptographic ledger represented by the block chain of the cryptocurrency exchange network to account for transference of value. In some embodiments, a cryptographically verifiable address can be associated with a cryptographic key (e.g., stored in the block chain). In some embodiments, a cryptographically verifiable address is or includes a cryptographic key. The cryptographic key can be a public key. In these embodiments, the public key can be used to verify cryptographic signatures produced by someone who possesses a private key associated with the public key.

Responsive to receiving the pending cryptocurrency transaction, the information compliance system determines a possible wallet service system corresponding to a recipient wallet service system for managing a recipient user account associated with a destination address indicated by the pending cryptocurrency transaction. The determination of the possible wallet service system can include selecting a wallet service system corresponding to the destination address from a mapping table. In some embodiments, the information compliance system monitors for one or more identity signals from one or more relevant computing devices associated with the cryptocurrency exchange network. For example, monitoring the identity signals includes scanning one or more transaction records of the block chain maintained by the cryptocurrency exchange network. The relevant computing devices can include a computing device that is part of the cryptocurrency exchange network or a computing device that communicates with the cryptocurrency exchange network. The information compliance system can then analyze (e.g., data mine) the identity signals to generate the mapping table of one or more external cryptographically verifiable addresses managed by one or more wallet service systems. The identity signals can include an ephemeral signal (e.g., signal that is detectable only during pendency of another cryptographic transaction). The identity signals can include a permanent signal (e.g., signal stored in a persistent database or log of the relevant computing devices).

In some embodiments, the information compliance system determines whether the information compliance system is able to identify the recipient wallet service system for managing the recipient user account associated with the destination address. Determining that the information compliance system is unable to identify can include determining that no wallet service known to the information compliance system is known to be associated with the recipient user account or the destination address. In one example, the information compliance system makes that determination by identifying a possible wallet service system as the recipient wallet service system for managing the recipient user account and attempting to verify the possible wallet service system as the recipient wallet service system. In another example, the information compliance system makes the determination by computing a confidence level of identifying a possible wallet service system as being associated with the destination address and determining that the confidence level is below a pre-determined threshold.

Responsive to determining that the information compliance system is unable to identify the recipient wallet service system, the information compliance system can broadcast an indication of the pending cryptocurrency transaction to a list of one or more known wallet services. The indication of the pending cryptocurrency transaction can include transaction information aside from the destination address, the destination address, or any combination thereof. In some embodiments, the information compliance system broadcasts a live feed of destination addresses and/or corresponding pending cryptocurrency transactions managed by unknown wallet services. In response, a recipient wallet service system for managing the recipient user account associated with the destination address can send an electronic message to the information compliance system. The electronic message can indicate an identifier of the recipient wallet service system. The information compliance system can then verify that the recipient wallet service system manages the recipient user account.

The information compliance system can verify that the possible wallet service system manages the recipient user account. The information compliance system can facilitate/cause (e.g., responsive to verifying that the possible wallet service system manages the recipient user account) an electronic information exchange of identity information of respective owners of at least a source address and the destination address indicated by the pending cryptocurrency transaction. The electronic information exchange can be between the transmitter wallet service system and the recipient wallet service system.

The information compliance system can then publish the pending cryptocurrency transaction to the cryptocurrency exchange network for inclusion into a block chain of the cryptocurrency exchange network. The block chain can be capable of irrefutably demonstrating transactional provenance of value transfers that sourced the pending cryptocurrency transaction. The publishing of the pending cryptocurrency transaction can be responsive to the electronic information exchange of the identity information.

What is claimed is:

1. A non-transitory computer readable data storage memory storing computer-executable instructions that, when executed by a computing device, cause the computing device to perform the steps of:

receiving a pending cryptocurrency transaction associated with a blockchain and from a transmitter wallet service system configured to operate a first computing node interfacing with the blockchain and manage a first wallet account on the blockchain, the first wallet account associated with a first cryptographically verifiable address in a cryptocurrency exchange network, the pending cryptocurrency transaction including the first wallet account and represented in transaction data by the first cryptographically verifiable address, the pending cryptocurrency transaction further including at least a second wallet account associated with a recipient wallet service system, the second wallet account represented in transaction data by a second cryptographically verifiable address;

generating a mapping table of the second cryptographically verifiable address managed by the recipient wallet service system, the mapping table includes destination addresses that have transacted with the second cryptographically verifiable address;

responsive to receiving the pending cryptocurrency transaction, determining the recipient wallet service system of the second cryptographically verifiable address, the recipient wallet service system configured to operate a second computing node interfacing with the blockchain and manages the second wallet account on the blockchain, said determining based on known wallet service systems associated with the destination addresses that have transacted with the second cryptographically verifiable address included in the mapping table;

verifying that the recipient wallet service system manages the recipient user account;

responsive to verifying that the wallet service system manages the recipient user account, transmitting identity information of a first owner of the first cryptographically verifiable address from the transmitter wallet service system to the recipient wallet service system; and responsive to verifying that the recipient wallet service system manages the recipient user account, transmitting identity information of a second owner of the second cryptographically verifiable address from the recipient wallet service system to the transmitter wallet service system.

2. The non-transitory computer readable data storage memory of claim 1, wherein the computer-executable instructions further cause the computing device to perform the steps of:

sending the second cryptographically verifiable address destination address to the recipient wallet service system to request for one or more record identifiers of a user account of the recipient wallet service system; and confirming the recipient wallet service system as the recipient wallet service system by matching the record identifiers against transaction recipient identifiers indicated by the pending cryptocurrency transaction.

3. A computer-implemented method of operating an information compliance system, comprising:

receiving, by the information compliance system, a pending cryptocurrency transaction associated with a blockchain and from a transmitter wallet service system configured to operate a first computing node interfacing with the blockchain and manage a first wallet account on the blockchain, the first wallet account associated with a first cryptographically verifiable address in a cryptocurrency exchange network, the pending cryptocurrency transaction including the first wallet account and represented in transaction data by the first cryptographically verifiable address, the pending cryptocurrency transaction further including at least a second wallet account associated with a recipient wallet service system, the second wallet account represented in transaction data by a second cryptographically verifiable address;

generating a mapping table of the second cryptographically verifiable address managed by the recipient wallet service system, the mapping table includes destination addresses that have transacted with the second cryptographically verifiable address;

responsive to receiving the pending cryptocurrency transaction, determining, by the information compliance system, the recipient wallet service system of the second cryptographically verifiable address, the recipient wallet service system configured to operate a second computing node interfacing with the blockchain and manages the second wallet account on the blockchain, said determining based on known wallet service systems associated with the destination addresses that have transacted with the second cryptographically verifiable address included in the mapping table;

verifying that the recipient wallet service system manages the recipient user account;

responsive to verifying that the wallet service system manages the recipient user account, transmitting identity information of a first owner of the first cryptographically verifiable address from the transmitter wallet service system to the recipient wallet service system; and responsive to verifying that the recipient wallet service system manages the recipient user account, transmitting identity information of a second owner of the second cryptographically verifiable address from the recipient wallet service system to the transmitter wallet service system.

4. The computer-implemented method of claim 3, wherein the mapping table is further generated from an ephemeral identity signal that is detectable only during pendency of another cryptographic transaction.

5. The computer-implemented method of claim 3, wherein the mapping table is further generated from a permanent identity signal stored in a persistent database or log of the relevant computing devices.

6. The computer-implemented method of claim 3, wherein the mapping table is further generated from monitored signals from a computing device that is part of the cryptocurrency exchange network.

7. The computer-implemented method of claim 3, wherein the mapping table is further generated from monitored signals from a computing device that communicates with the cryptocurrency exchange network.

8. The computer-implemented method of claim 3, wherein mapping table is further generated from scanning one or more transaction records of the block chain maintained by the cryptocurrency exchange network.

* * * * *